United States Patent
Pisoni

(10) Patent No.: US 7,543,009 B2
(45) Date of Patent: Jun. 2, 2009

(54) FRACTIONAL FOURIER TRANSFORM CONVOLVER ARRANGEMENT

(75) Inventor: Fabio Pisoni, Busto Garolfo (IT)

(73) Assignee: STMicroelectronics Belgium NV, Zaventem (BE)

( * ) Notice: Subject to any disclaimer, the term of this patent is extended or adjusted under 35 U.S.C. 154(b) by 821 days.

(21) Appl. No.: 10/746,851

(22) Filed: Dec. 24, 2003

(65) Prior Publication Data

US 2004/0220986 A1  Nov. 4, 2004

(30) Foreign Application Priority Data

Dec. 24, 2002  (EP) .................................. 02447272
Dec. 24, 2002  (EP) .................................. 02447274

(51) Int. Cl.
G06F 15/00  (2006.01)

(52) U.S. Cl. ....................................... 708/403; 708/404

(58) Field of Classification Search .................. 708/403, 708/404
See application file for complete search history.

(56) References Cited

U.S. PATENT DOCUMENTS

| | | | |
|---|---|---|---|
| 4,903,247 A * | 2/1990 | Van Gerwen et al. | 367/135 |
| 5,914,933 A * | 6/1999 | Cimini et al. | 370/208 |
| 6,400,782 B2 * | 6/2002 | Tal et al. | 375/350 |
| 6,519,291 B1 * | 2/2003 | Dagdeviren et al. | 375/260 |
| 2002/0181404 A1 * | 12/2002 | Insler et al. | 370/241 |

FOREIGN PATENT DOCUMENTS

| | | |
|---|---|---|
| EP | 0853383 | 7/1998 |
| EP | 0797878 | 3/2002 |
| EP | 1185047 A1 * | 3/2002 |

OTHER PUBLICATIONS

Park et al., Analysis of the Jointly Adapting and Asynchronously Configured V.32 Modem Implementation, Signals Systems and Computers, 1991, 1991 Conference Record of the Twenty-Fifth Asilomar Conference on Pacific Grove, CA, USA, Nov. 4-6, 1991, Los Alamitos, CA, USA, IEEE Comput. Soc., US, pp. 683-688, XP010026389.

Rice et al., Loop Control Architectures for Symbol Timing Synchronization in Sampled Data Receivers, 2002 Milcom Proceedings; Global Information Grid—Enabling Transformation Through 21st Century Communications, Anaheim, CA, US, Oct. 7-10, 2003, IEEE Military Communications Conference Milcom 2002, pp. 987-991, XP002241728.

(Continued)

*Primary Examiner*—Lewis A Bullock, Jr.
*Assistant Examiner*—Michael Yaary
(74) *Attorney, Agent, or Firm*—Lisa K. Jorgenson; Allen, Dyer, Doppelt, Milbrath & Gilchrist, P.A.

(57) ABSTRACT

An M-point Fractional Fourier is described using several 2M-points traditional Fourier transforms. The signal path is fed through a series of blocks including a first multiplier, a zero pad, an FFT, a second multiplier, an IFFT, a first half element, and a third multiplier. The first and third multipliers have as their other inputs a value $\exp(-j\Pi n^2\alpha)$ for n=0:M-1, derived from the clock offset signal represented by $\alpha$.

22 Claims, 8 Drawing Sheets

OTHER PUBLICATIONS

Park et al., A Novel Structure for Real-Time Digital Sample-Rate Converters with Finite Precision Error Analysis, Speech Processing 2, VLSI, Underwater Signal Processing, Toronto, May 14-17, 1991, International Conference on Acoustics, Speech & Signal Processing ICASSP, New York, IEEE, US, vol. 2 Conf. 16, pp. 3613-3616, XP010043651.

Bailey et al., The Fractional Fourier Transform and Applications, http://science.nas.nasa.gov, Oct. 22, 1990, pp. 1-19, XP002246429.

Cariolaro et al., Multiplicity of Fractional Fourier Transforms and their Relationships, IEEE Transactions on Signal Processing, Jan. 2000, IEEE, USA, vol. 28, No. 1, pp. 227-241, XP002246430.

Akay et al., Broadband Interference Excision in Spread Spectrum Communication Systems Via Fractional Fourier Transform, Signals, Systems & Computers, 1998, Conference Record of the Thirty-Second Asilomar Conference on Pacific Grove, CA, USA, Nov. 1, 1998, pp. 832-837, XP010324272.

* cited by examiner

FRACTIONAL FOURIER TRANSFORM CONVOLVER ARRANGEMENT

FIELD OF THE INVENTION

The present invention relates to convolver arrangements and methods for calculating fast fractional discrete Fourier transforms and their inverse which may find application in telecommunications devices such as interpolators, transceivers having such interpolators, modems including such transceivers and to corresponding software and methods.

BACKGROUND OF THE INVENTION

Asymmetric high speed Digital Subscriber Line (ADSL) and Very high speed Digital Subscriber Line (VDSL) are examples of modem communication systems which permit transmission of data over band limited communication lines at very high rates, e.g., up to 52 Mbits/s—see for example "ADSL, VDSL and Multicarrier Modulation", J. A. C. Bingham, Wiley, 2000. They are examples of multi-carrier systems. Multi-carrier modulation is well known for transmitting digital data by splitting the data into fixed-length data blocks or symbols each having the same number of sub-blocks or bits. Analog transmission of these blocks is carried out using a set of carrier signals. There is a carrier for each of the sub-blocks in one block. The carriers have frequencies that are equally spaced across the transmission band of the transceiver. One such arrangement is called discrete multi-tone (DMT). DMT modems transmit data by dividing it into several interleaved bit streams, and using these bit streams to modulate several carriers.

Another application of multicarrier modulation is in OFDM systems, as described for instance in "OFDM for Wireless Multimedia Communications", R. van Nee and R. Prasad, Artech House, 2000. Applications are for example, wireless LANs. This modulation technique also finds application in satellite communications, see for example, "Satellite Communications Systems", G. Maral, M. Bousquet, Wiley, 1998.

In a receiver for use in an ADSL system for instance, following time domain equalization (TEQ), removal of the cycle prefix (CP), followed by a Fast Fourier Transform (FFT), complementary to the IFFT of the transmitter, is performed. The signal may then be passed to a frequency domain equalizer (FDEQ) to recover the signals as transmitted from the received signals, e.g., QAM symbols, from which the bit streams are recovered.

Calculating Fast Fourier transforms and their inverses can be performed by standard components and software packages. However, there is also a need to calculate fractional Fourier transforms in a more efficient manner.

SUMMARY OF THE INVENTION

An object of the present invention is to provide an improved apparatus and method for calculating fast fractional discrete Fourier transforms and their inverse for enabling the amount of processing to be limited.

Another object is to provide a transmitter or a receiver having a Fast Fractional Fourier Transform arrangement. The Fast Fractional Fourier Transform is a discrete fractional transform.

Yet another object is to provide a modem having the transmitter and the receiver described above. The modem may be fabricated as an integrated circuit.

In one aspect of the present invention, a fast-convolver using 2N points to emulate linear convolution through FFTs, as shown in FIG. 5 is provided. In particular, an N-points Fractional Fourier Transform arrangement or circuit is disclosed comprising at least one 2N-points fast Fourier transform block. In addition, the circuit may comprise a 2N-points inverse Fast Fourier transform block and a further 2N-points fast Fourier transform block.

Another aspect of the present invention is a fast-convolving method using 2N point processing to emulate linear convolution through FFTs, as shown in FIG. 5. In particular, a method of N-points Fractional Fourier Transforming is disclosed as comprising at least one 2N-points fast Fourier transform. In addition, the method may comprise a 2N-points inverse Fast Fourier transform and a further 2N-points fast Fourier transform.

Another aspect of the invention provides software for implementing the fast fractional Fourier transform above. This is intended to encompass software for carrying out (which encompasses controlling) corresponding method steps. This acknowledges that such software can be a valuable, separately tradable commodity.

A fractional fast Fourier transform arrangement in the form of software is intended to encompass software which runs on or controls dumb or standard hardware, to carry out the desired functions, (and therefore the software essentially defines the functions of the arrangement, even before it is combined with its standard hardware). For similar reasons, it is also intended to encompass software which describes or defines the configuration of hardware, such as HDL (hardware description language) software, as is used for designing silicon chips, or for configuring universal programmable chips, to carry out desired functions.

A further aspect of the present invention is a receiver for receiving a multicarrier signal comprising data symbols and a cyclic prefix. The receiver may comprise means for splitting a received data stream into different parts to form a first and second data stream; means for performing a Fast Fractional Fourier Transform interpolation on each of the first and second data streams with different delays to thereby extract cyclic prefixes and data symbols independently; and means for combining the extracted cyclic prefixes and the data symbols.

The present invention also provides a method of processing a multicarrier signal comprising data symbols and a cyclic prefix. The method may comprise splitting a received data stream into different parts to form a first and a second data stream; performing a Fast Fractional Fourier Transform interpolation on each of the first and second data streams with different delays to thereby extract cyclic prefixes and data symbols independently; and combining the extracted cyclic prefixes and the data symbols. The present invention also comprises software for carrying out the above method.

As the advantages set out above can feed through to enable a better network, which is more reliable or more flexible, or greater capacity, or more cost effective for example, consequently a communication service over the network can show a corresponding improvement, and directly affect the value of such services. Such increased value over the life of the system could prove far greater than the sales value of the equipment.

Any of the features can be combined with any of the aspects of the invention as would be apparent to those skilled in the art. Other advantages will be apparent to those skilled in the art.

BRIEF DESCRIPTION OF THE DRAWINGS

To show by way of example how the present invention can be implemented, embodiments will now be described with reference to the figures in which:

FIGS. 3 to 6 show aspects of the clock compensation arrangements based on fractional Fourier (Chirp type) transform arrangements according to the present invention;

DETAILED DESCRIPTION OF THE PREFERRED EMBODIMENTS

Figure 1:
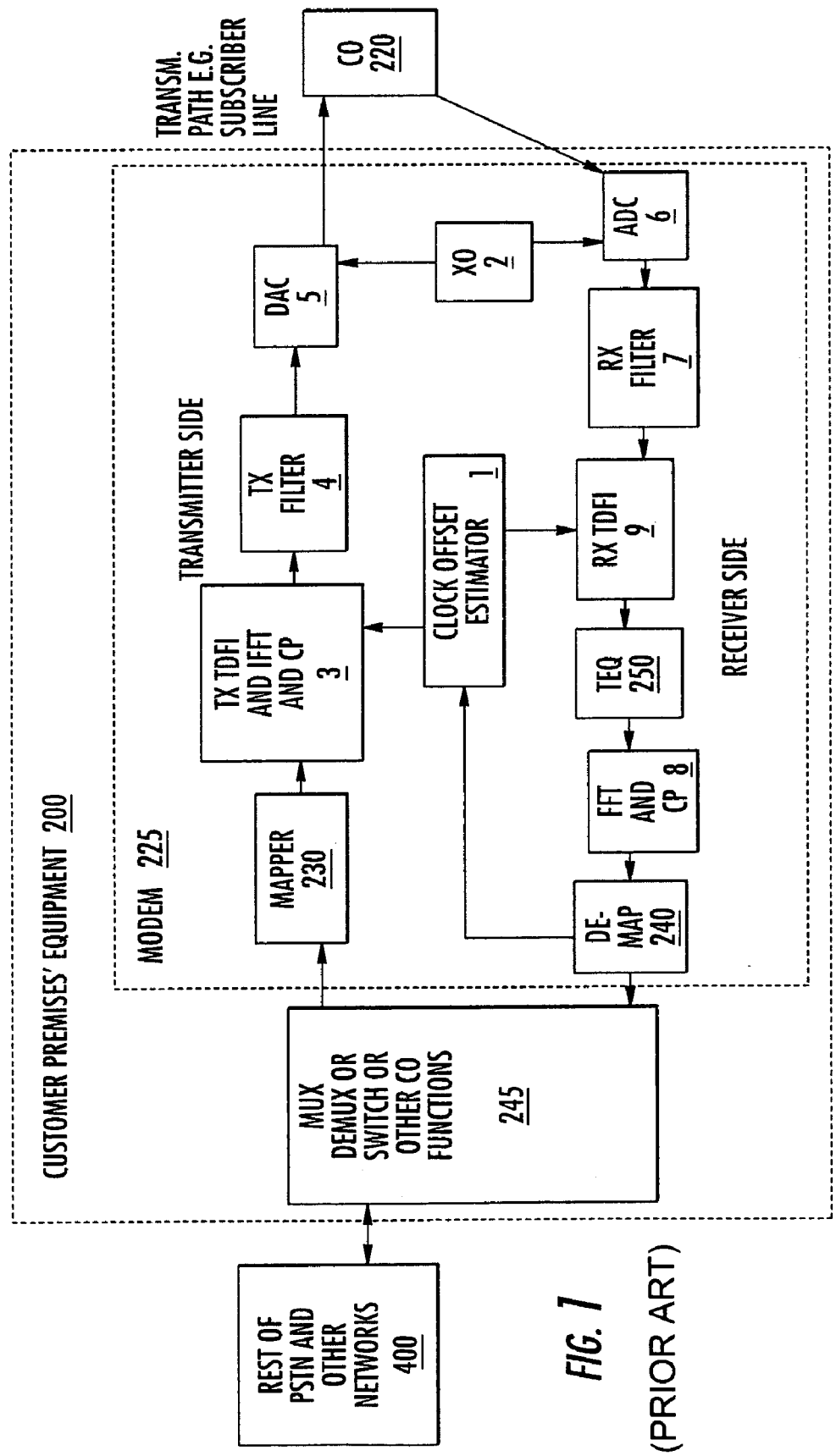
FIG. 1 shows an embodiment in the form of a modem having a TDFI (transform domain fractional interpolator) clock offset compensation arrangement according to the prior art.

In the drawings, and in the following descriptions, like elements have been assigned like numerals for the sake of consistency. The present invention will be described with reference to certain embodiments and drawings but the present invention is not limited thereto. Those skilled in the art will appreciate that the present invention has wide application as indicated by the attached claims, for example, in xDSL, VDSL, ADSL modems, satellite transmitters and receivers, especially those using OFDM, wireless local area network receivers or transmitters, e.g., using multicarrier modulation such as OFDM, those using the protocol IEEE 803.11. Applications also include digital audio broadcasting (DAB) systems, DBV-T systems, audio applications, e.g., in compensation for frequency warping, pitch distortion, in video systems, e.g., image pre- or post-processing. Applications further include radar or sonar applications including time-frequency filtering. In particular the present invention provides an interpolator having a module for calculating a fast fractional discrete Fourier transform and its inverse, which is simpler to implement and is faster in operation than conventional techniques.

The fast fractional Fourier transform will mainly be described with reference to its application in an interpolator but this is by way of example only. The arrangement and methods embodied in the arrangement have wider application and are not limited to these applications.

With respect to the clock-offset in accordance with the present invention, the offset is assumed to be perfectly estimated on a symbol-by-symbol time base, though in practice it will be a source of a small additional error. Further, a rotor may be added into any of the embodiments of the present invention in addition to an interpolator to provide additional compensation according to the clock offset signal. Before describing implementation of the embodiments of the compensation arrangement, a typical application will be described.

FIG. 1: modem having clock offset compensation. In FIG. 1, a modem 225 having a discrete multi-tone (DMT) transceiver is illustrated, which includes a receiver side and a transmitter side employing a compensation arrangement TDFI 3, 9 according to respective embodiments of the present invention. The modem is located in a CP (Customer Premises) 200 coupled to a subscriber line for transmitting to or receiving from a Central Office 220. The embodiments are equally applicable at the Central Office side or in other types of multicarrier communications links such as cable connections, wireless links and so on. The modem is shown incorporated in customer premises' equipment having other functions 245 such as mux or demux or switching, to couple many subscriber lines via modems to the rest of the PSTN or other networks 400.

The transmitter side has a mapper 230 for receiving data to be modulated and transmitted, and a signal output for outputting transmit signals to a digital-to-analog converter (DAC) 5 for subsequent transmission. The receiver side has a receive signal input for receiving signals transmitted from remote transceivers via an analog-to-digital converter (ADC) 6, and a receive data output for outputting dispersion suppressed received data to a demapper 240. A transmission path exists from the transmitter portion output to the CO 220, and another exists in the reverse direction to the receiver portion input along the subscriber line. The path includes at least a hybrid transformer (not shown) of the transceiver and may include other elements of the transceiver located outside the transmitter portion and the receiver portion of the transceiver.

In the transmitter side, the mapper 230 feeds a TX (transmitter) TDFI (transform domain fractional interpolator) 3 which also has an inverse fast Fourier transform unit (IFFT) and cyclic prefix part CP for adding a guard band in the form of a cyclic prefix between each block or symbol. This part receives input data in the form of frequency-domain DMT data blocks comprised of N complex-valued data elements from the mapper 230. The TDFI carries out clock offset compensation as described below, according to a clock offset output by estimator 1, and derived from received signals. The IFFT part modulates each of the N data elements with N carrier signals at evenly spaced frequency intervals, thereby converting the N frequency-domain data elements into a block (or symbol) of N real-valued time-domain samples.

The cyclic prefix part (CP) copies the last L samples of the N time-domain sample block to form a cyclic prefix therewith, and provides the cyclic prefix to the beginning of the block. This is done in order to reduce inter-block interference at the remote transceiver to which the block of (N+L) samples is subsequently transmitted. The output of the cyclic prefix part is DMT transmit signals comprising a plurality of time-domain multi-carrier transmit blocks/symbols.

The DMT transmit signals are subsequently passed through a transmitter low-pass filter unit 4 and through a digital-to-analog converter DAC 5 prior to duplex transmission to the remote transceiver. The receiver portion input is coupled to an analog-to-digital converter (ADC) 6 arranged to digitize received DMT time-domain signals received from a remote transceiver, and to pass those signals, so digitized, through a receiver filter 7.

Before time domain equalization is applied by TEQ 250, clock offset is compensated by the RX (receive side) TDFI (Transform domain fractional interpolator) to the signals output of the receive filter 7. As in the transmit side, this is carried out according to the clock offset signal from the estimator 1. After time domain equalization, an FFT and CP part removes the cyclic prefix guard band and converts the signal into frequency domain signals.

These are fed to the demapper 240 to produce de-modulated data samples following conventional principles. The output of the receiver side of the modem is passed on to other parts of the central office equipment for onward routing and transmission. Other parts of the modem such as echo cancellation and so on are not shown for the sake of clarity. The data transmitted can be anything including digitized voice call information, packet data relating to internet access or any other type of communication service.

Figure 2:
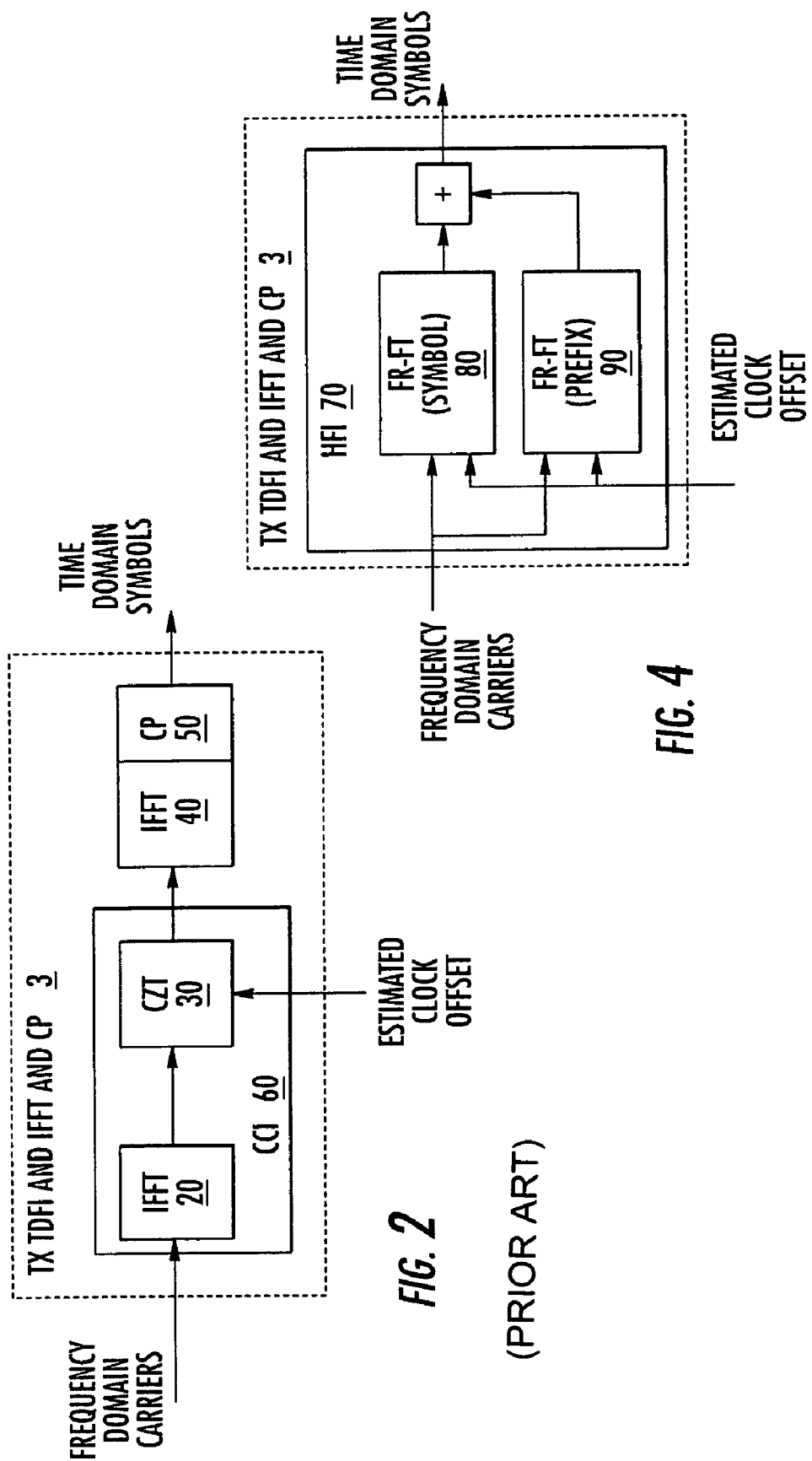
FIG. 2 shows an embodiment of a clock offset compensation arrangement based on chirp carrier interpolation according to the prior art.

FIG. 2, Chirp Carrier Interpolator for TX TDFI: FIG. 2 shows an embodiment of a compensation arrangement according to the prior art. It represents one of a number of ways of implementing the TX TDFI and IFFT and CP part 3 of FIG. 1, or can be used in other applications. This part includes a Chirp Carrier Interpolator CCI 60, which feeds an IFFT part 40 followed by a CP part 50. The CCI comprises another IFFT part 20 in series with a CZT (chirp Z transform) part 30. The CCI part takes frequency domain inputs and carries out a clock offset compensation digitally in a transform domain based on linear Fourier and Z-chirp transforms. The transforms are chosen to minimize the computational load. An explanation of their derivation now follows, starting with an analysis of the effects of the clock offset. The term chirp refers to changes in the frequency of a signal with time.

Clock-Offset introduces a tone-dependant frequency shift and a sample-dependant time delay. A non-oversampled system (NFt=F0) is assumed, and the following definitions are used:

T0=the nominal sampling period at TX@2.208MHz;
Ts=the real sampling period at RX ADC: and
ppm=the precision mismatch (worst case for ADSL ppm=250)

$$k, n = 0 \ldots N - 1$$

$$10^6 \cdot T_0 = (10^6 - ppm) \cdot T_S$$

$$F_0 = \frac{1}{T_0} \quad F_S = \frac{1}{T_S}$$

$$F_S = F_0 \frac{10^6 - ppm}{10^6} = F_0 \left(1 - \frac{ppm}{10^6}\right)$$

$$T_S = T_0 \left(\frac{10^6}{10^6 - ppm}\right)$$

$$\Delta F_T = \frac{F_S - F_0}{N} = -\frac{1}{N} F_0 \frac{ppm}{10^6}$$

$$\Delta T = T_S - T_0 = T_0 \left(\frac{ppm}{10^6 - ppm}\right)$$

The sub-carrier frequency offset for the sub-carrier k, and the time-delay accumulated at sample n and the correspondent new grids k' and n' are:

$$\Delta f_k = k \cdot \Delta F_T = -\frac{k}{N} F_0 \frac{ppm}{10^6}$$

$$k' = k + \frac{\Delta f_k}{F_T} = k\alpha$$

$$\alpha = 1 - \frac{ppm}{10^6}$$

$$\Delta t_n = n \cdot \Delta T = n \cdot T_0 \left(\frac{ppm}{10^6 - ppm}\right)$$

$$n' = n + \frac{\Delta t_n}{T_0} = \frac{n}{\alpha}$$

The phase offset introduced by varying the carrier k or sample n (and keeping the other constant) are:

$$\Phi(n, k) = 2\pi \cdot f_k t_n \quad k, n = 0 \ldots N - 1$$

$$\begin{aligned}
\Delta\Phi_{\bar{n}}(k) &= 2\pi \cdot \Delta f_k t_n \\
&= 2\pi\left(-\frac{k}{N} F_0 \frac{ppm}{10^6}\right) \cdot \bar{n} T_0 \\
&= -\frac{2\pi}{N} k\bar{n} \frac{ppm}{10^6} \\
&= -\frac{2\pi}{N} k\bar{n}(1 - \alpha)
\end{aligned}$$

$$\begin{aligned}
\Delta\Phi_{\bar{k}}(n) &= 2\pi \cdot f\Delta_k t_n \\
&= 2\pi\left(\bar{k}\frac{F_0}{N}\right) \cdot nT_0 \frac{ppm}{10^6 - ppm} \\
&= \frac{2\pi}{N} \bar{k}n \frac{ppm}{10^6 - ppm} \\
&= \frac{2\pi}{N} \bar{k}n\left(\frac{1 - \alpha}{\alpha}\right)
\end{aligned}$$

Chirp Carrier Interpolation: The frequency interpolation formula given its samples are (DC at index k/2+1, N is even):

$$X(\omega) = \frac{1 - e^{-j\omega N}}{N} \sum_{k=-N/2}^{N/2-1} \frac{X(k)}{1 - e^{j(\omega - 2\pi k/N)}}$$

Evaluating on the fractional grid hα:

$$\omega(h\alpha) = 2\pi h\alpha/N \quad h = -N/2 \ldots + N/2 - 1$$

$$X(h\alpha) = \frac{1 - e^{-j2\pi h\alpha}}{N} \sum_{k=-N/2}^{N/2-1} \frac{X(k)}{1 - e^{-j2\pi/N(h\alpha - k)}}$$

The following Chirp Z-Transform can be defined over the time-sequence x(n):

$$r_0 = R_0 = 1 \quad \vartheta_0 = 0 \quad \Phi_0 = 2\pi\alpha/N$$

$$\begin{aligned}
X_c(m) &= r_0 e^{j\vartheta_0} \sum_{n=0}^{N-1} x(n) e^{-j\Phi_0 k} \\
&= \sum_{n=0}^{N-1} x(n) e^{-j2\pi k\alpha m/N}
\end{aligned}$$

Given an aliased form Xa of X (DC is at index 0 Xa=fftshift (X)):

$$\begin{aligned}
X_c(m) &= \sum_{n=0}^{N-1} x(n) e^{-j2\pi m\alpha n/N} \\
&= \sum_{n=0}^{N-1} \left[\sum_{k=0}^{N-1} X_a(k) e^{j2kn/N}\right] \cdot e^{-j2\pi m\alpha n/N}
\end{aligned}$$

$$= \sum_{k=0}^{N-1} X_a(k) \cdot \sum_{n=0}^{N-1} e^{j2\pi(k-m\alpha)n/N}$$

$$= \frac{1}{N} \sum_{k=0}^{N-1} X_a(k) \frac{1 - e^{j2\pi(k-m\alpha)}}{1 - e^{j2\pi(k-m\alpha)/N}}$$

$$= \frac{1 - e^{-j2\pi m\alpha}}{N} \sum_{k=0}^{N-1} \frac{X_a(k)}{1 - e^{-j2\pi(m\alpha-k)/N}}$$

$$= \frac{1 - e^{-j2\pi m\alpha}}{N} \sum_{k=-N/2}^{N/2-1} \frac{X(k)}{1 - e^{-j2\pi(m\alpha-k)/N}} = X(m\alpha)$$

Thus, the interpolated carriers on the fractional grid $k\alpha$ (where $\alpha$ is a non-integer number) can be efficiently computed from the carriers X on the normal grid k by an inverse-FFT over X followed by a Chirp Z-Transform. This result is particularly useful because fast implementations of the Chirp Z-Transform transform are presented by the present invention with complexity $O(N*\log(N))$ which enables the computational load to be eased.

Based on this result, the CCI takes as input the carriers to be transmitted and interpolates them on a fractional grid based on the estimated clock-offset. The interpolated carriers are then fed to the normal IFFT without needing an additional TDI part. The cyclic prefix has to be chirped independently.

The CCI is specified by the following Matlab function:
X=carrier input (non-aliased format);
Xw=interpolated carrier (non-aliased format);
ppm=clock mismatch;
function Xw=cci_interp(X, ppm);
alpha=1−ppm/1e6;
N=length(X);
w=exp(−sqrt(−1)*2*pi/N*alpha);
A=exp(−sqrt(−1)*2*pi/N*(N/2)*alpha);
x=ifft(fftshift(X));
Xw=czt(x, N, w, A);
Xw(1)=1/N*sum(X);
return.

FIGS. 3-6, Hubert Fractional Interpolation In the TX path: An alternative way of implementing the TX TDFI and IFFT and CP part 3 of FIG. 1 will now be described with reference to FIGS. 3-6. This alternative can be used in other applications. It is based on a different type of transform, using Hilbert Fractional Interpolation, and in the TX path it can operate on frequency domain carriers as an input and output time-domain signal.

Given a time domain causal signal $x_k(n)$ n=0 ... N−1 the instantaneous phase is defined as the phase of the correspondent analytic signal, where HT(x) indicates the Hilbert transform of x:

$$\Phi_k(n) = \arg(x_k(n) + j \cdot HT(x_k(n))) \quad n=0 \ldots N-1$$

When a single-tone k is passed throught the IFFT, and a clock-offset of ppm (part per million) is present, then the istantaneous phase of the time-domain analytic signal will be given the following offset:

$$\Delta\Phi_k(n) = \frac{2\pi}{N} kn \frac{1-\alpha}{\alpha} \quad k, n = 0 \ldots N-1$$

$$\alpha = 1 - \frac{ppm}{10^6}$$

Figure 3:
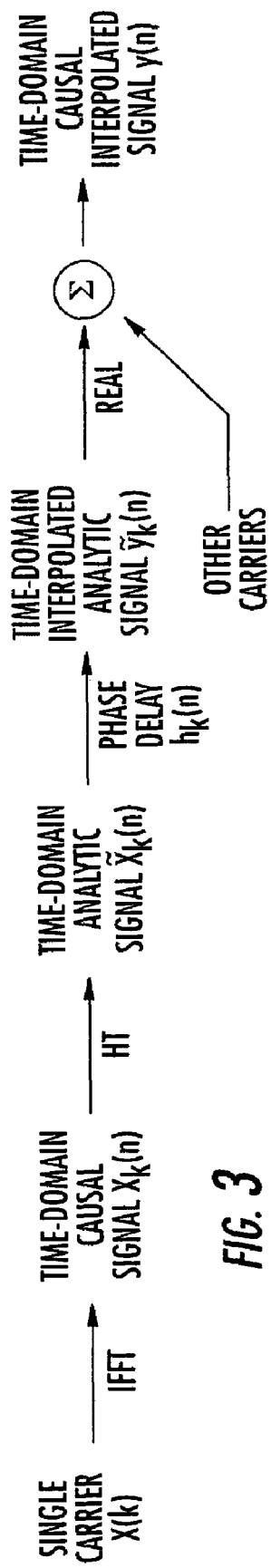

For single-tone analytic signals in particular, the phase is localized in time. The phase delay effect can be easily computed as a vector product by hk(n). As the Hilbert and Fourier transforms are linear, each analytic single-tone component can be delayed separately and then summed together. This principle is shown in FIG. 3, which illustrates how a single carrier is subject to an IFFT to give a time-domain causal signal. This is subject to a Hilbert Transform to give a time domain analytic signal, which after a phase delay becomes a time domain interpolated analytic signal. The same signals derived from other carriers can be summed to give the output, a time domain causal interpolated signal. Following the signal names shown in FIG. 3, the expression for the interpolated (causal) signal xw(n) is obtained as follows:

$$\tilde{x}_k(n) = \frac{2}{N} X(k) \cdot \exp\left(j\frac{2\pi}{N}kn\right)$$

$$h_k(n) = \exp(j \cdot \Delta\Phi_k(n)) = \exp\left(j\frac{2\pi}{N}kn\frac{1-\alpha}{\alpha}\right)$$

$$y(n) = \sum_{k=0}^{N/2-1} \tilde{x}_k(n) \cdot h_k(n) = \frac{2}{N} \sum_{k=0}^{N/2-1} X(k) \cdot \exp\left(j\frac{2\pi}{N}nk\frac{1}{\alpha}\right)$$

The fractional-Fourier transform Gk of $\delta$ over a generic signal s(k) is defined as follows (different definitions for the FRFT exist, the one used here is indeed a chirp-Z-transform):

$$G_k(s(k), \delta) = \sum_{k=0}^{N-1} s(k) \cdot \exp(-j2\pi nk\delta) \quad k = 0 \ldots N-1$$

Hence, by comparing this definition with the expression of y(n) it can be seen that the (causal) interpolated signal y(n) can be obtained by a fractional Fourier transform (real part of) over the single side spectrum $\tilde{X}_s(k)$ k=0 ... N−1 obtained by X(k) as follows. The DC component has to be halved as the number of carriers is even. Also the Nyquist carrier is assumed to be zero:

$$\tilde{X}_s(k) = \begin{cases} X(k)/2 & k = 0 \\ X(k) & k = 1 \ldots N/2 - 1 \\ 0 & k = N/2 \ldots N - 1 \end{cases}$$

$$y(n) = \frac{2}{N} G_k\left(\tilde{X}_s(k), \frac{-1}{\alpha N}\right) \quad k = 0 \ldots N-1$$

As before, this is valuable because fast implementations of the fractional Fourier transform exists with complexity $O(N*\log2(N))$ so this can enable the computational load to be eased. In accordance with an embodiment of the present invention an implementation of the Fast Fractional Fourier algorithm is specified in the following Matlab function (merely for convenience) for both even and odd length of the vector x:

Fast fractional frourier transform
return Gk(x,alpha) with k=0. . . N−1
where:
　N=length(x) (even case)
　N=length(x)−1 (odd case)
　function G=fast_frf(x, alpha
　M=length(x);
　if (mod (M,2))
　　N=M−1; x odd length
　　P=N−1;

else
  N=M; x even length
  P=N;
end
y=[x.'.*exp(-sqrt(-1)*pi*(0:M-1).^2*alpha), zeros (1, P)].';
z=[exp(sqrt(-1)*pi*(0:N-1).^42*alpha), exp(sqrt(-1)*pi*(N:-1:1).^2*alpha)]';
w=ifft(fft(y).*fft(z));
G=w(1:N).*exp(-sqrt(-1)*pi*(0:N-1).^2*alpha).';
return.

The normal direct/inverse Fourier transform can be obtained as special cases:

$$\left. \begin{array}{l} \mathit{fft}(x) = \mathrm{fast\_frf}(x,\ 1/N) \\ \mathit{ifft}(x) = \dfrac{1}{N} \mathrm{fast\_frf}(x,\ -1/N) \end{array} \right\} \ \forall\, x(n),\ n = 1\ \ldots\ N$$

The Hilbert Fractional Interpolator (HFI) is represented by the following Matlab function:
  Hilbert Fractional Interpolator . . .
  XY=input carriers (from 0 . . . N/2)
  y=time-domain interpolated signal
  ppm=clock mismatch
  function y=hfi_interp(XY, ppm)
  alpha=1-ppm/1e6;
  N=length(XY)*2;
  y=2/N*real(fast_frf([XY(1)/2; XY(2:end); zeros(N/2,1)], -1/alpha/N));
  return.

Figure 5:
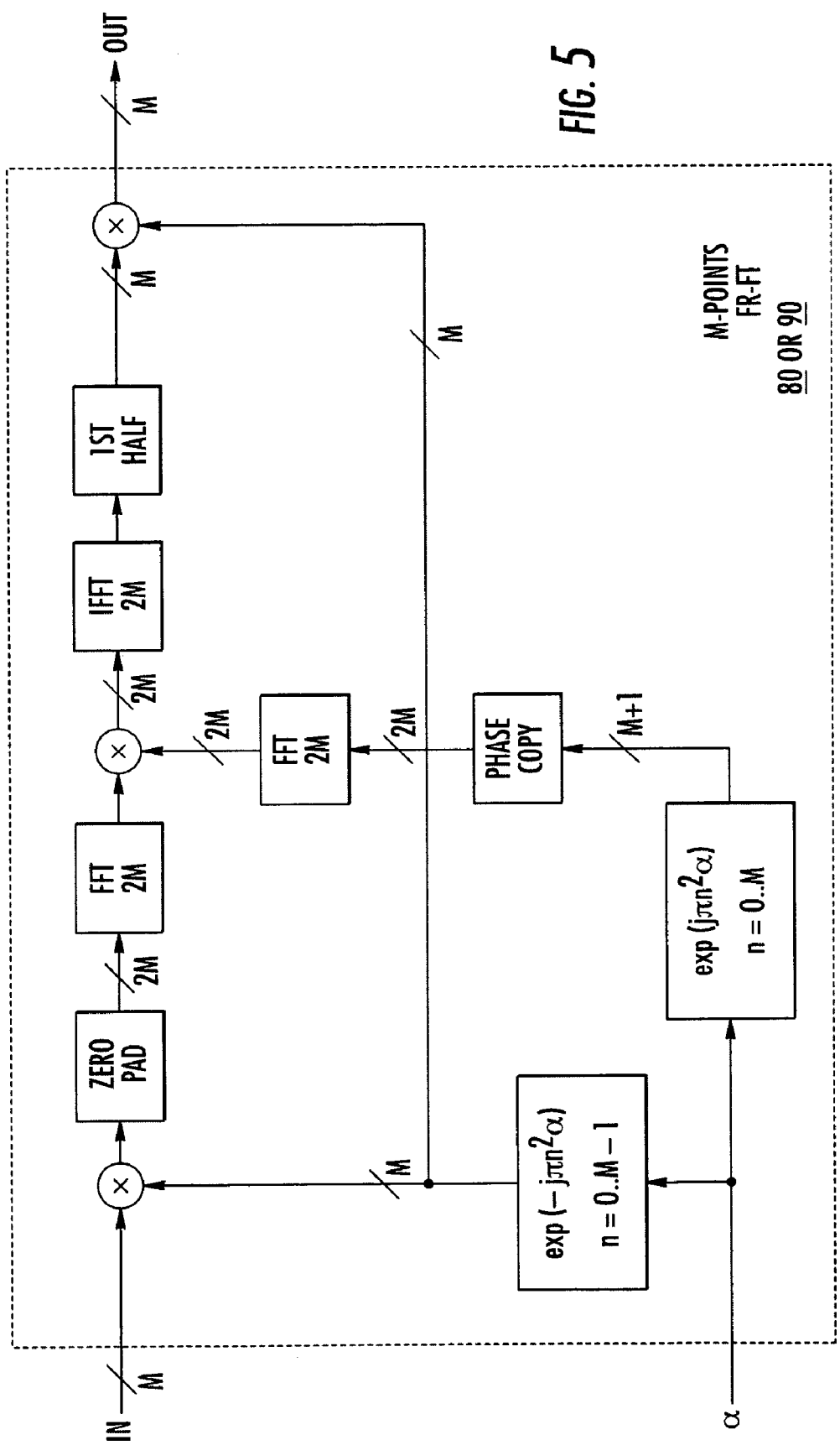
Figure 6:
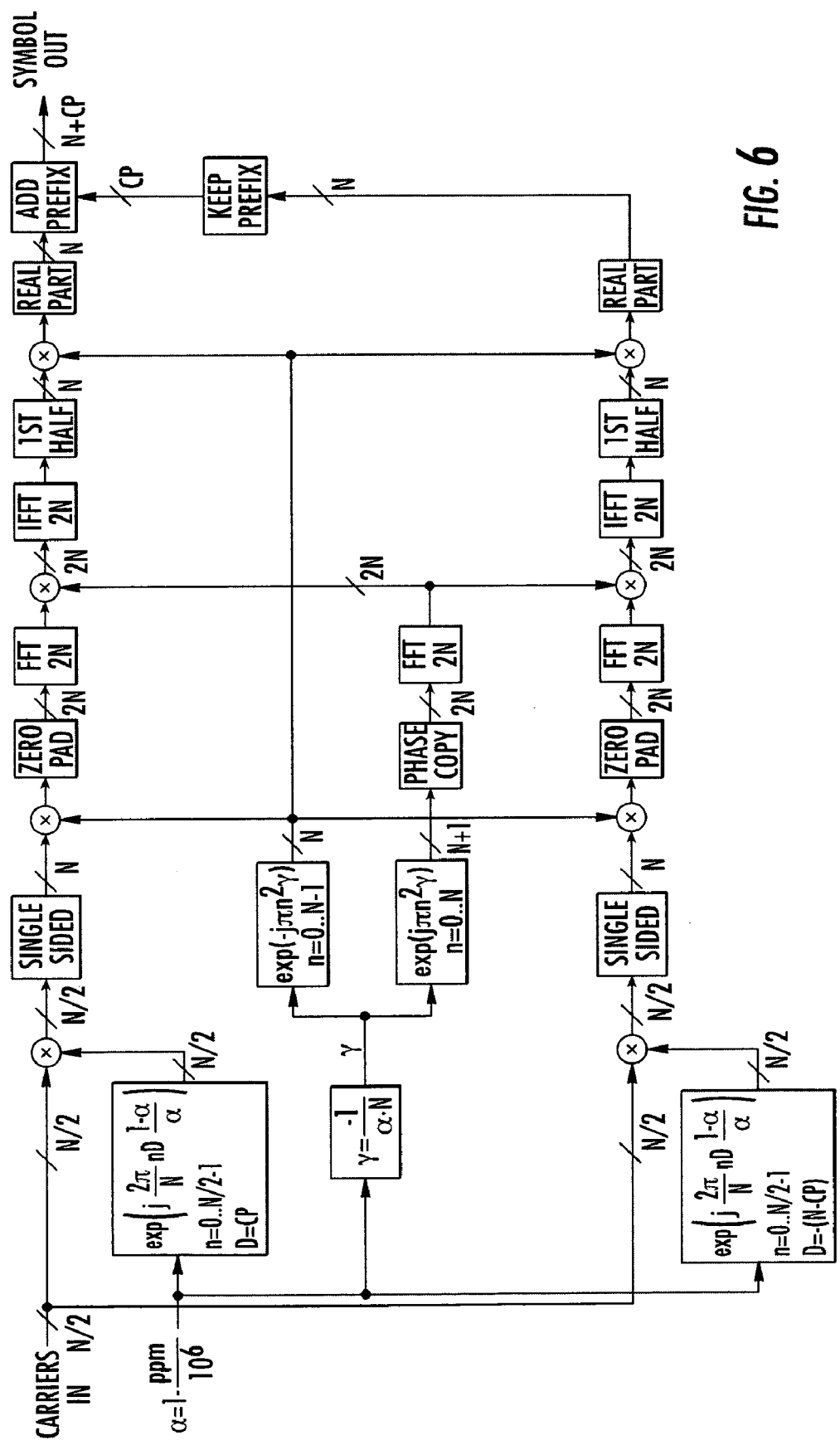

FIGS. 4, 5, 6 Cyclic Prefix Insertion: The cyclic-prefix insertion is a non-linear operation. In a clock-mismatched transmitter this cannot be done simply by prepending the last CP samples as the stretch/shrink effects of the clock-offset will be different at the beginning and at the end of the symbol. Two effects have to be accounted for when the prefix is inserted:

a) the actual N-samples symbol starts CP samples later, which introduces an additional phase offset; and b) the prefix cannot be copied from the interpolated samples and must be interpolated separately.

The first effect is addressed with an additional phase-delay of D samples in hk(n):

$$\tilde{x}_k(n) = \frac{2}{N} X(k) \cdot \exp\left(j \frac{2\pi}{N} kn\right) \quad \text{(Equation 1)}$$

$$h_{D,k}(n) = \exp(j \cdot \Delta\Phi_k(n+D)) = \exp\left(j \frac{2\pi}{N} k(n+D) \frac{1-\alpha}{\alpha}\right)$$

$$y_D(n) = \sum_{k=0}^{N/2-1} \tilde{x}_k(n) \cdot h_{D,k}(n)$$

$$= \frac{2}{N} \sum_{k=0}^{N/2-1} X(k) \cdot \exp\left(j \frac{2\pi}{N} kD \frac{1-\alpha}{\alpha}\right) \cdot \exp\left(j \frac{2\pi}{N} kn \frac{1}{\alpha}\right)$$

The second effect is addressed with an additional fractional Fourier call over the same carriers. The idea is to have a zero-phase offset at the sample N−CP as this will become the first interpolated sample. This can be obtained with a negative delay of −(N−CP) samples and keeping only the output samples from N−CP to N−1 as interpolated prefix. In both cases, the main tool is the Delayed Fractional Hilbert Interpolator defined by Equation 1 and implemented by the following Matlab function:

Delayed Hilbert Fractional Interpolator.
  XY=input carriers (from 0 . . . N/2)
  y=time-domain interpolated signal
  ppm=clock mismatch
  delay=in samples (ex. N−CP+1)
  function y=delay_hfi_interp(XY, ppm, delay
  alpha=1-ppm/1e6;
  N=length(XY)*2;
  Xd=[XY(1)/2; XY(2:end); zeros(N/2,1)];
  Xd=Xd.*exp(sqrt(-1)*2*pi/N*(0:N-1)*delay*(1/alpha-1)).';
  y=2/N*real(fast_frf(Xd, -1/alpha/N));
  return.

The interpolated prefix y_p and the N-samples symbol y_n are then obtained with two fractional Fourier calls over the same carriers with different delays:

N=512; CP=32; ppm=251;   xy = carriers 0 . . . N/2
y_p = delay_hfi_interp(xy,ppm,-(N-CP));
y_p = y_p(N-CP+1:end);                CP samples prefix
y_n = delay_hfi_interp(xy,ppm,CP);    N samples symbol The complete. TX HFI Interpolator for the TX path involves combining the interpolation of the symbol and prefix in a single block/function 70, as shown in FIG. 4. There is some scope for reducing redundancy by sharing common exponential factors as shown in FIG. 5. The resulting DMT HFI Interpolator for the TX path (from carriers to time-domain) is specified by the following Matlab function. The arguments are the same as before, where CP specifies the length of the prefix in samples (i.e. 32 for ADSL). The variables yn and yp are the output (fractionally interpolated) symbol and prefix. The two 2N-points fast convolutions have been compacted in a single Matlab function. The pre and post exponential factors (variables A,B,C) are shared between symbol and prefix fast convolvers.

DMT Hilbert Fractional Interpolator . . .
  XY=input carriers (tones 0 . . . N/2-1)
  ppm=clock mismatch
  CP=cyclix prefix size in samples
  [yn,yp]=interpolated symbol,prefix
  function [yn, yp]=dmt_hfi_interp(XY, ppm, CP)
  N=length(XY)*2;
  alpha=1-ppm/1e6;
  gamma=-1/alpha/N;
  Xs=[XY(1)/2; XY(2:end)];
  Xn=[Xs.*exp(sqrt(-1)*2*pi/N*(0N/2-1)*(CP)*(1/alpha-1)).';zeros(N/2,1)];
  Xp=[Xs.*exp(sqrt(-1)*2*pi/N*(0:N/2,1)*(CP-N)*(1/alpha-1)).';zeros(N/2,1)];
  A=exp(-sqrt(-1)*pi*(0:N-1).^2*gamma).';
  B=exp(sqrt(-1)*pi*(0:N).^2*gamma).';
  B=fft([B ; B(end-1:-1:2)]);
  C=A(1:N);
  an=[Xn.*A ; zeros(N,1)];
  bn=ifft(fft(an).*B);
  yn=2/N *real(bn(1:N).*C);
  ap=[Xp.*A ; zeros(N,1)];
  bp=ifft(fft(ap).*B);
  yp=2/N *real(bp(1:N).*C);
  yp=yp(N-CP+1:N);
  return.

This specification is already suitable for a fast hardware implementation of the HFI that employs standard FFT blocks and multipliers. Implementation of the HFI Interpolator in the TX path can be done with two FRFT (Fractional Fourier Transform) calls, from the carrier domain, directly to the fractional time-domain grid, without an additional TDI in the TX path. This is represented in FIG. 4 which shows the HFI part 70 comprising a first FR-FT block 80 for processing the symbol, and a second block 90 for processing the prefix. Both have as inputs the frequency domain carriers and the clock offset estimate. The outputs of the blocks are combined by block 85. Prefix insertion involves pre-pending some samples at the beginning of the DMT frame. The result is a DMT frame longer in time but the values are the same as before to produce the time domain output having the prefix.

Each FR-FT block in FIG. 4 can be implemented following the Matlab function fast_frf( ) as shown in FIG. 5 which is an embodiment of the present invention. An M-point Fractional Fourier is obtained using several 2M-points traditional Fourier transforms. In this figure, the signal path is fed through a series of blocks including a first multiplier, a zero pad, an FFT 2m, a second multiplier, an IFFT 2M, a first half element, and a third multiplier. The first and third multipliers have as their other inputs a value $\exp(-j\Pi n^2 \alpha)$ for n=0:M−1, derived from the clock offset signal represented by $\alpha$. However, this representation of alpha is relevant to this application and may represent other functions in other applications. The second multiplier has as its other input, the value $\exp(j\Pi n^2 \alpha)$ for n=0:M, after that value is subjected to a phase copy and an FFT 2M operation.

Following the previous derivations, the complete HFI block 70 specified by function dmt_hfi_interpo can be implemented as shown in the block diagram of FIG. 6. As can be seen this diagram represents essentially an expansion or implementation of FIG. 4 using the parts shown in FIG. 5. An additional step not shown in FIG. 5 is a multiplication of the carriers at the input by a factor $\exp\{j[2\Pi/N]nD[1-\alpha]/\alpha\}$ for n=0.N/2−1, D=CP or D=−(N−CP) respectively to achieve the desired delays. This is followed by a single sided operation. Also, as the other inputs to the three multipliers are common to both the FR-FT blocks, the derivation of these inputs is shared rather than duplicated, to minimize computational load.

Figure 7:
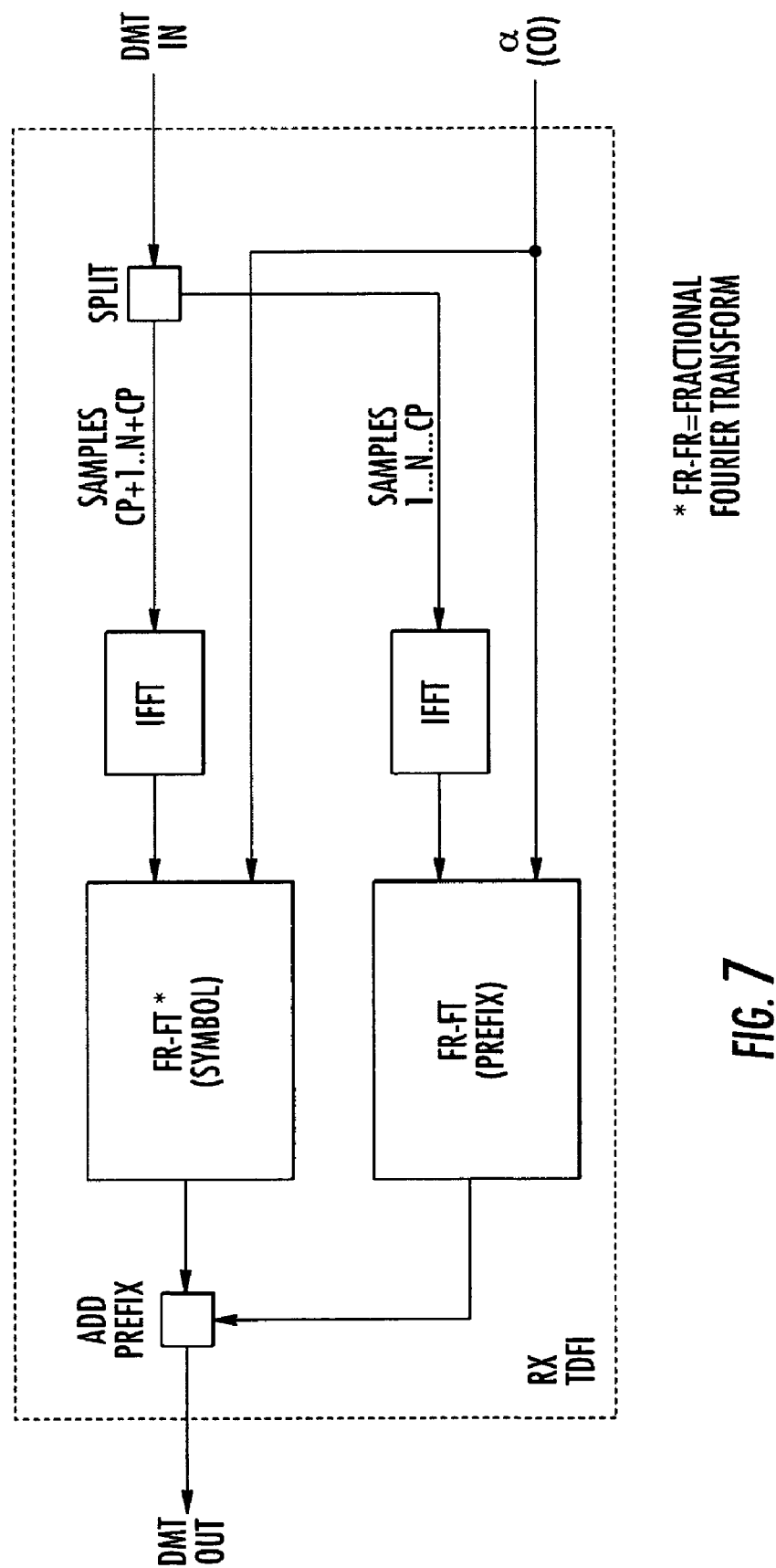
FIGS. 7 and 8 show aspects of the clock compensation arrangements for a receive path according to the present invention.
Figure 8:
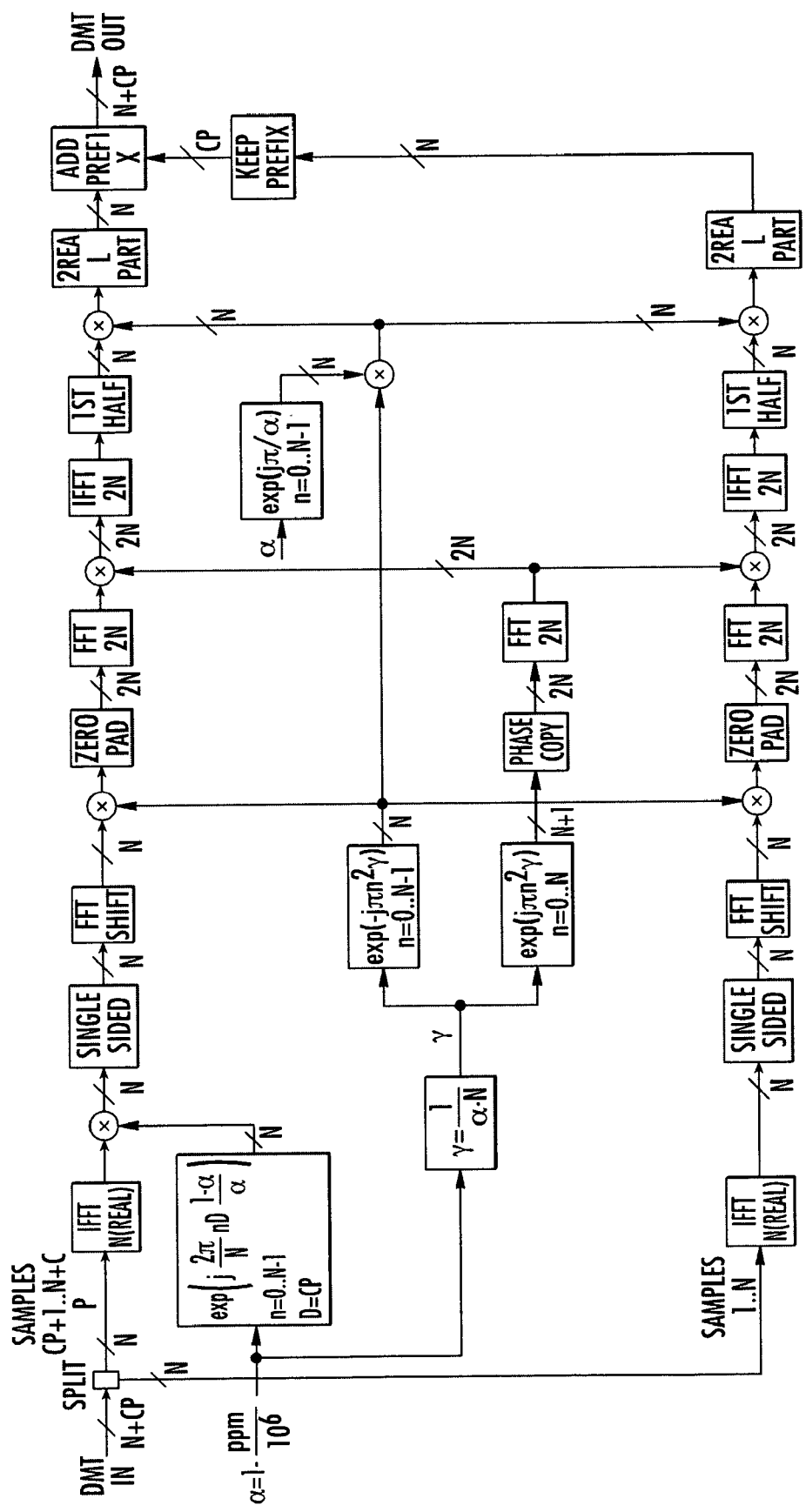

FIGS. 7, 8, Fractional Interpolation in the RX Path: Given the presence in the RX path of a time-equalizer, the approach used for the TX path cannot be applied directly. Thus, the received symbol, sampled with the local clock, has to be interpolated and output in the same domain, to enable it to be passed through the time-equalizer. A well known-technique to do time interpolation with a normal DFT exists and can be extended for a fractional delay by the Fractional Fourier Transform. A notable advantage over the classical DFT approach is that the complexity of the resulting interpolator does not depend on the fractional delay.

The same notation as for the function delay_hfi_interpo is used. The input argument 'x' now represents the received symbol in the time-domain. The time domain fractional interpolator is specified as follows.

Time-to-Time Fractional Interpolator . . .
x=input symbol (N samples)
ppm=clock mismatch
delay=. . . in samples
y=interpolated symbol
function y=delay_tdfi_interp(x, ppm, delay
N=length(x);
alpha=1-ppm/1e6;
Y=ifft(x).*exp(-sqrt(-1)*2*pi/N*(0:N−1)*delay*(1-alpha)/alpha).';
Z=fftshift([Y(1)/2; Y(2:N/2); Y(N/2+1)/2zeros(N/2-1,1)]
y=2*real(fast_frf(Z , 1/alpha/N).*exp(sqrt(-1)*Pi*(0:N−1)/alpha).');
return.

The interpolated prefix 'y_p' and the N-samples symbol 'y_n' are then obtained with two fractional Fourier calls over different parts of the received (N+CP samples long) symbol 'xx', with different delays:
N=512; CP=32; ppm=251; % xx is N+CP samples=received DMT
y_n=delay_tdfi_interp(xx(CP+1:N+CP), ppm, CP);
y_p=delay_tdfi_interp(xx(1:N), ppm, 0);
y_p=y_p(1:CP).

The complete Fractional Interpolator for the RX path involves combining the interpolation of the symbol and prefix in a single block/function where the redundancies are minimized by sharing common exponential factors. A high level view is shown in FIG. 7 and more detail of a possible implementation is shown in FIG. 8. Again in FIG. 8, as the other inputs to the three multipliers are common to both the FR-FT blocks, the derivation of these inputs is shared rather than duplicated, to minimize computational load. First the Matlab representation is set out.

This specification discloses a fast hardware implementation of the TDFI that employs standard FFT blocks and multipliers. The Fractional Interpolator in the RX path of the received symbol has input and output in the time-domain, and is achieved by two FRFT (Fractional Fourier Transform) calls as shown in FIG. 7. This shows the input signal being split, with samples 1 . . . CP being fed to an IFFT which feeds the FR-FT (PREFIX) part. Samples CP+1 . . . N+CP are fed to an IFFT which feeds FR-FT (SYMBOL). As in FIG. 4, the clock offset $\alpha$ is fed to both FR-FT blocks, and the outputs of the blocks are concatenated. The FR-FT block is again the one shown in FIG. 4. A complete block diagram for the RX interpolator shown in FIG. 8, follows the Matlab function dmt_tdfi_interp( ) set out above. It is similar to that of FIG. 6, and so need not be described further. Notably, there is no delay operator at the input to the FR-FT (PREFIX) part, the bottom row of the figure because the prefix starts at sample 0, i.e., without any delay in position. The prefix is pre-pended to the frame.

Alternative implementations for the RX side clock offset compensation can be envisaged if the TEQ need not be implemented, or if it can be implemented elsewhere, or implemented in the frequency domain, so that the clock offset outputs can be in the frequency domain. For example, in the latter case a structure is created very similar to the TX HFI but reversed in the order of the FFT/Chirp-Z transforms.

Figure 9:
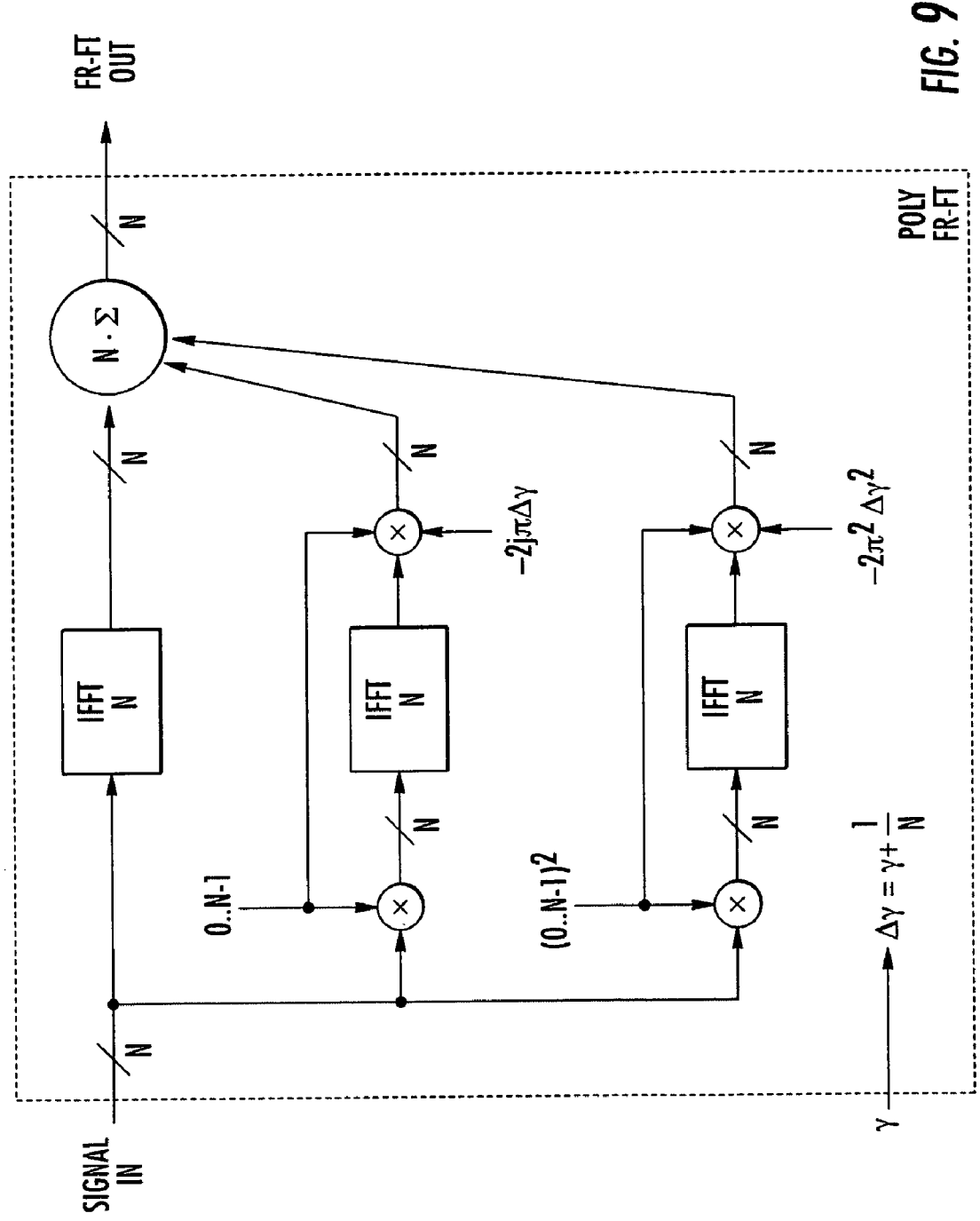
FIG. 9 shows an approximation for a fractional transform according to the present invention.

FIG. 9, Approximations of the Fractional Fourier Transform: The structures presented so far are exact, in the sense that they give the performance of an ideal trigonometric interpolator over N samples. To find approaches that are computationally cheaper and still acceptable in terms of performances, the fractional Fourier transform block has to be approximated in some way.

One way is by series expansion (more suitable for TX path than RX path), and an example is shown in FIG. 9, as will now be explained. The argument in each call to the fractional Fourier transform in the TX path is:

$$\gamma = \frac{-1}{\alpha N} = \frac{1}{(1 - ppm \cdot 10^{-6})N} \approx \frac{-1}{N}$$

$$\Delta \gamma = \gamma - \left(\frac{-1}{N}\right) = \frac{ppm}{(ppm - 10^6)N}$$

Δγ is very small in the low ppm range of interest. This suggests a Taylor series decomposition of the Fractional Fourier kernel around the point −1/N as follows:

$$\exp(-j2\pi nk\gamma) \approx \exp\left(j\frac{2\pi}{N}nk\right) - j2\pi nk\left(\gamma + \frac{1}{N}\right)\exp\left(j\frac{2\pi}{N}nk\right) +$$
$$-2\pi^2 n^2 k^2\left(\gamma + \frac{1}{N}\right)^2 \exp\left(j\frac{2\pi}{N}nk\right) + \frac{4}{3}j\pi^3 n^3 k^3\left(\gamma + \frac{1}{N}\right)^3 \exp\left(j\frac{2\pi}{N}nk\right) + \ldots$$

Thus, the fractional Fourier has been turned into a sum of windowed Fourier transforms applied to windowed versions of the input vector, where the windows are constant, linear, parabolic etc.

$$\left.\begin{array}{l} G_k(s(n), \gamma) = \sum_{n=0}^{N-1} s(k)\cdot\exp(-j2\pi nk\gamma) \\ F_k^{-1}(s(n)) = \frac{1}{N}\sum_{n=0}^{N-1} s(k)\cdot\exp\left(j\frac{2\pi}{N}nk\right) \end{array}\right\} n, k = 0 \ldots N-1$$

$$G_k(s(n), \gamma)\frac{1}{N} \approx F_k^{-1}(s(n)) - 2j\pi k F_k^{-1}(n\cdot s(n))\Delta\gamma -$$
$$2\pi^2 k^2 F_k^{-1}(n^2\cdot s(n))\Delta\gamma^2 + \ldots$$

The approximation is good for low tones but degrades rapidly with the tone index. Also, the method is limited by the high dynamic range required to window the input vector. Thus, it is suitable only when the input vector has only a small initial subset which is non-zero. This is the case for the Upstream TX path when oversampling is used in the TX-IFFT. There, only few carriers are active with respect to the number of points N of the IFFT (i.e. carriers 7-31 with N=512).

The block diagram (showing the first, second and third terms of the series) derived from the equation is shown in FIG. 9. For each term there is an IFFT N part and a pre-multiplier and a post multiplier. The pre-multiplier produces a product of the input signal and a factor and feeds the product to the IFFT N part. The output of the IFFT N part is fed to the post-multiplier whose output is multiplied by the same factor and another factor derived from the clock offset, to generate the term. All the terms are then summed to give the final output. The factors are given in the equation above. This 'POLY FR-FT' block can be plugged directly in FIG. 4 as a replacement of the 'FR-FT' block. The appropriate delays for the symbol and prefix have to be included as in FIG. 6. The complexity in real multiplications per symbol can be about half the complexity of an HFI TX interpolator.

Figure 10:
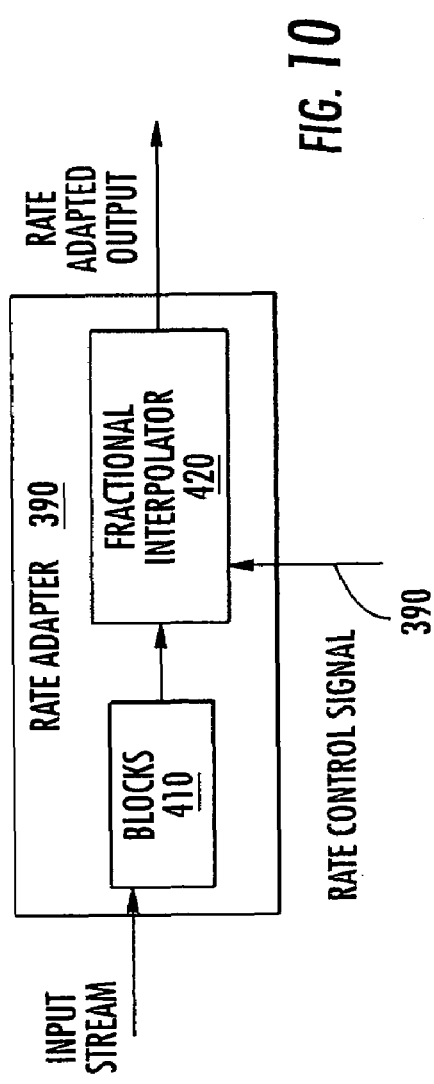
FIG. 10 shows a rate adapter according to another embodiment of the present invention.

FIG. 10, rate adapter: FIG. 10 shows an embodiment for general purpose rate adaptation. A rate adapter 390 has an input part 410 and a fractional interpolator 420. An input signal is fed to the input part 410 which feeds blocks of data to the fractional interpolator 420. The interpolator operates on the blocks according to a rate control signal to produce a rate adapted output. The input part 410 can be implemented as a storage buffer. The fractional interpolator can be implemented as described above for example. Generally, the two rates are almost the same, the target ppm range is tenths/hundreds of ppm.

As has been described above, a fractional fast Fourier transform arrangement has been described. The arrangement can be applied to receivers or transmitters of multicarrier modems, or any application which needs rate adaption or synchronization. In particular the fractional fast Fourier transform arrangement can be implemented in an interpolator.

Any of the functions shown can be implemented using standard software languages or procedures, for execution on standard hardware such as general purpose microprocessors, DSPs, or application specific integrated circuits, for example. The modem, receiver or transmitter structures can be efficiently implemented with DSP cores, for example, for single chip products. The software contains code which may execute on any suitable computing device or processing engine having memory such as a microprocessor, e.g., Pentium IV™ supplied by Intel Corp. USA or similar, or a programmable gate array such as a Field Programmable Gate Array, a Programmable Array Logic, or a Programmable Logic Array. The software may also be stored on a suitable data carrier, e.g., an optical disk such as a CD-ROM, a DVD-ROM; magnetic tape; a hard disk; a memory of a network element in a telecommunications network or in a personal computer or a work station such as a UNIX workstation.

Other variations will be apparent to those skilled in the art, having corresponding advantages to those set out above, within the scope of the claims. For instance reference has been made to discrete Fast Fourier Transforms and their inverses as well as a fractional variation of these, but similar results may be obtained with other wave or wavelet based transforms such as the Discrete Wavelet Transform and its inverse. For the latter a fractional variant is generated.

That which is claimed is:

1. An electronic device for performing an M-point Fractional Fourier Transform on an input signal, where M is a nonzero integer, the electronic device comprising:
   a first 2M-points fast Fourier transformer having an input for receiving the input signal;
   a second 2M-points fast Fourier transformer having an input for receiving an independent signal;
   a first multiplier having respective inputs coupled to an output of said first 2M-points fast Fourier transformer, and to an output of said second 2M-points fast Fourier transformer;
   a 2M-points inverse fast Fourier transformer having an input coupled to an output of said first multiplier;
   a first half element coupled to an output of said 2M-points inverse fast Fourier transformer for reducing an output therefrom from 2M-points to M-points;
   a second multiplier coupled to an output of said first half element and providing an output signal representing an M-point Fractional Fourier Transform of the input signal;
   a third multiplier coupled to the input of said first 2M-points fast Fourier transformer; and
   a first exponential circuit coupled to inputs of said second and third multipliers for calculating $\exp(-j\Pi n^2\alpha)$ for n=0:M−1, derived from the independent signal having a value α.

2. An electronic device according to claim 1, further comprising:
   a second exponential circuit for calculating a value $\exp(j\Pi n^2\alpha)$ for n=0:M, where α is a value of the independent signal; and
   a phase copy circuit having an input coupled to an output of said second exponential circuit for copying an output signal therefrom, and having an output coupled to said second 2M-points fast Fourier transformer.

3. An electronic device according to claim 1, wherein the electronic device is configured as a transmitter.

4. An electronic device according to claim 1, wherein the electronic device is configured as a receiver.

5. An electronic device according to claim 1, wherein the electronic device is configured as a modem.

6. An electronic device according to claim 1, further comprising a substrate; and wherein said first and second 2M-points fast Fourier transformers, said first multiplier and said 2M-points inverse fast Fourier transformer are on said substrate so that the electronic device is an integrated circuit.

7. A computer-readable medium having computer-executable instructions for causing a receiver to perform steps comprising:

calculating a first 2M-points fast Fourier transform using a first 2M-points fast Fourier transformer having an input for receiving an input signal, where M is a non-zero integer;

calculating a second 2M-points fast Fourier transform using a second 2M-points fast Fourier transformer having an input for receiving an independent signal;

performing a first multiplication of the first and second 2M-points fast Fourier transforms using a second multiplier having respective inputs coupled to an output of the first 2M-points fast Fourier transformer, and to an output of the second 2M-points fast Fourier transformer;

calculating a 2M-points inverse fast Fourier transform using a 2M-points inverse fast Fourier transformer having an input coupled to an output of the first multiplier;

calculating a first halving of a signal output by the 2M-points inverse fast Fourier transformer using a first half element coupled to an output of the 2M-points inverse fast Fourier transformer for reducing an output therefrom from 2M-points to M-points;

performing a second multiplication based on the first halving signal using a second multiplier coupled to an output of the first half element for providing an output signal representing an M-point Fractional Fourier Transform of the input signal;

performing a third multiplication using a third multiplier coupled to the input of the first 2M-points fast Fourier transformer; and calculating a first exponential equation of $\exp(-j\Pi n^2\alpha)$ for n=0:M−1 using a first exponential block coupled to inputs of the second and third multipliers, the calculating being derived from the independent signal having a value $\alpha$.

8. A computer-readable medium according to claim 7, further comprising:

calculating a second exponential calculation of $\exp(j\Pi n^2\alpha)$ for n=0:M using a second exponential block, where $\alpha$ is a value of the independent signal; and copying an output signal from the second exponential block using a phase copy block having an input coupled to an output of the second exponential block for copying an output signal therefrom, and having an output coupled to the second 2M-points fast Fourier transformer for performing a Fractional Fourier Transform in the additional 2N-points fast Fourier transform block.

9. A receiver comprising:

a splitter for splitting a received multicarrier signal into first and second data paths, with the first data path providing a first data stream corresponding to data symbols and with the second data path providing a second data stream;

each respective data path comprising the following for processing the first and second data streams with different delays to independently extract cyclic prefixes and the data symbols therefrom a first 2M-points fast Fourier transformer having an input for receiving the input signal, a second 2M-points fast Fourier transformer having an input for receiving an independent signal, a second multiplier having respective inputs coupled to an output of said first 2M-points fast Fourier transformer, and to an output of said second 2M-points fast Fourier transformer, a 2M-points inverse fast Fourier transformer having an input coupled to an output of said first multiplier, a first half element coupled to an output of said 2M-points inverse fast Fourier transformer for reducing an output therefrom from 2M-points to M-points, a second multiplier coupled to an output of said first half element, a third multiplier coupled to the input of said first 2M-points fast Fourier transformer, a first exponential circuit coupled to inputs of said second and third multipliers for calculating $\exp(-j\Pi n^2\alpha)$ for n=0:M−1, derived from the independent signal having a value $\alpha$, and with said second 2M-points fast Fourier transformer and said first exponential circuit being shared by the respective data paths; and a combiner for combining the independently extracted cyclic prefixes and the data symbols.

10. A receiver according to claim 9, further comprising:

a second exponential circuit for calculating a value $\exp(j\Pi n^2\alpha)$ for n=0:M, derived from a signal having a value $\alpha$;

a phase copy circuit having an input coupled to an output of said second exponential circuit for copying an output signal therefrom, and having an output coupled to an input of said second 2M-points fast Fourier transformer;

with said second exponential circuit and said phase copy circuit being shared by the respective data paths.

11. A method for processing a multicarrier signal comprising data symbols and cyclic prefixes, the method comprising:

splitting the multicarrier signal into a first data stream corresponding to the data symbols and into a second data stream corresponding to the cyclic prefixes;

processing each respective data stream with different delays to independently extract the cyclic prefixes and the data symbols therefrom, the processing comprising calculating a first 2M-points fast Fourier transform using a first 2M-points fast Fourier transformer having an input for receiving an input signal, where N is a nonzero integer, calculating a second 2M-points fast Fourier transform using a second 21M-points fast Fourier transformer having an input for receiving an independent signal, performing a second multiplication of the first and second 2M-points fast Fourier transforms using a first multiplier having respective inputs coupled to an output of the first 2M-points fast Fourier transformer, and to an output of the second 2M-points fast Fourier transformer, calculating a 2M-points inverse fast Fourier transform using a 2M-points inverse fast Fourier transformer having an input coupled to an output of the first multiplier, calculating a first halving of a signal output by the 2M-points inverse fast Fourier transformer using a first half element coupled to an output of the 2M-points inverse fast Fourier transformer for reducing an output therefrom from 2M-points to M-points, performing a second multiplication based on the first halving signal using a second multiplier coupled to an output of the first half element, performing a third multiplication using a third multiplier coupled to the input of the first 2M-points fast Fourier transformer;

calculating a first exponential equation of $\exp(-j\Pi n^2\alpha)$ for n=0:M−1 using a first exponential block coupled to inputs of the second and third multipliers, the calculating being derived from the independent signal having a value $\alpha$, and where calculating the second 2M-points fast Fourier transform and calculating the first exponential equation are shared by the respective data streams; and combining the independently extracted cyclic prefixes and the data symbols.

12. A method according to claim 11, further comprising a second exponential block for calculating a value $\exp(j\Pi n^2\alpha)$ for n=0:M, derived from a signal having a value $\alpha$; and a phase copy block having an input coupled to an output of the second exponential block for copying an output signal and having an output coupled to the second 2N-points fast Fourier transformer, with the second exponential block and the phase copy block being shared by the respective data streams.

13. An electronic device for performing an M-point Fractional Fourier Transform on an input signal, where M is a nonzero integer, the electronic device comprising:
 a first 2M-points fast Fourier transformer having an input for receiving the input signal;
 a second 2M-points fast Fourier transformer having an input for receiving an independent signal;
 a first multiplier having respective inputs coupled to an output of said first 2M-points fast Fourier transformer, and to an output of said second 2M-points fast Fourier transformer;
 a 2M-points inverse fast Fourier transformer having an input coupled to an output of said second multiplier;
 a first half element coupled to an output of said 2M-points inverse fast Fourier transformer for reducing an output therefrom from 2M-points to M-points;
 a second multiplier coupled to an output of said first half element and providing an output signal representing an M-point Fractional Fourier Transform of the input signal;
 a first exponential circuit for calculating a value $\exp(j\Pi n^2\alpha)$ for n=0:M, where $\alpha$ is a value of the independent signal; and
 a phase copy circuit having an input coupled to an output of said first exponential circuit for copying an output signal therefrom, and having an output coupled to said second 2M-points fast Fourier transformer.

14. An electronic device according to claim 13, further comprising:
 a third multiplier coupled to the input of said first 2M-points fast Fourier transformer; and
 a second exponential circuit coupled to inputs of said second and third multipliers for calculating $\exp(-j\Pi n^2\alpha)$ for n=0:M−1, derived from the independent signal having a value $\alpha$.

15. An electronic device according to claim 13, wherein the electronic device is configured as a transmitter.

16. An electronic device according to claim 13, wherein the electronic device is configured as a receiver.

17. An electronic device according to claim 13, wherein the electronic device is configured as a modem.

18. An electronic device according to claim 13, further comprising a substrate; and
 wherein said first and second 2M-points fast Fourier transformers, said first multiplier and said 2M-points inverse fast Fourier transformer are on said substrate so that the electronic device is an integrated circuit.

19. A receiver comprising:
 a splitter for splitting a received multicarrier signal into first and second data paths, with the first data path providing a first data stream corresponding to data symbols and with the second data path providing a second data stream;
 each respective data path comprising the following for processing the first and second data streams with different delays to independently extract cyclic prefixes and the data symbols therefrom
  a first 2M-points fast Fourier transformer having an input for receiving the input signal,
  a second 2M-points fast Fourier transformer having an input for receiving an independent signal,
  a first multiplier having respective inputs coupled to an output of said first 2M-points fast Fourier transformer, and to an output of said second 2M-points fast Fourier transformer,
  a 2M-points inverse fast Fourier transformer having an input coupled to an output of said first multiplier,
  a first half element coupled to an output of said 2M-points inverse fast Fourier transformer for reducing an output therefrom from 2M-points to M-points,
  a second multiplier coupled to an output of said first half element,
  a first exponential block for calculating a value $\exp(j\Pi n^2\alpha)$ for n=0:M, derived from a signal having a value $\alpha$,
  a phase copy block having an input coupled to an output of said first exponential block for copying an output signal therefrom, and having an output coupled to an input of said second 2M-points fast Fourier transformer, and
  with said second 2M-points fast Fourier transformer, said first exponential block and said phase copy block being shared by the respective data paths; and
 a combiner for combining the independently extracted cyclic prefixes and the data symbols.

20. A receiver according to claim 19, further comprising a second exponential block coupled to inputs of said second and third multipliers for calculating $\exp(-j\Pi n^2\alpha)$ for n=0:M−1, derived from the independent signal having a value $\alpha$, with said second exponential block being shared by the respective data paths.

21. A method for processing a multicarrier signal comprising data symbols and cyclic prefixes, the method comprising:
 splitting the multicarrier signal into a first data stream corresponding to the data symbols and into a second data stream corresponding to the cyclic prefixes;
 processing each respective data stream with different delays to independently extract the cyclic prefixes and the data symbols therefrom, the processing comprising
  calculating a first 2M-points fast Fourier transform using a first 2M-points fast Fourier transformer having an input for receiving an input signal, where M is a non-zero integer,
  calculating a second 2M-points fast Fourier transform using a second 2M-points fast Fourier transformer having an input for receiving an independent signal, performing a first multiplication of the first and second 2M-points fast Fourier transforms using a first multiplier having respective inputs coupled to an output of the first 2M-points fast Fourier transformer, and to an output of the second 2M-points fast Fourier transformer, calculating a 2M-points inverse fast Fourier transform using a 2M-points inverse fast Fourier transformer having an input coupled to an output of the first multiplier, calculating a first halving of a signal output by the 2M-points inverse fast Fourier transformer using a first half element coupled to an output of the 2M-points inverse fast Fourier transformer for reducing an output therefrom from 2M-points to M-points, performing a second multiplication based on the first halving signal using a second multiplier coupled to an output of the first half element, calculating a first exponential equation $\exp(j\Pi n^2 \alpha)$ for n=0:M, derived from a signal having a value $\alpha$, copying an output signal from the second exponential block using a phase copy block, and providing an input to the second 2M-points fast Fourier transformer, and with the second 2M-points fast Fourier transformer, the first exponential equation and the phase copy block being shared by the respective data streams; and combining the independently extracted cyclic prefixes and the data symbols.

22. A method according to claim 21, further comprising calculating a second exponential equation of $\exp(-j\Pi n^2 \alpha)$ for n=0:M−1 using a second exponential block coupled to inputs of the second and third multipliers, derived from the independent signal having a value $\alpha$, and where calculating the second exponential equation is shared by the respective data streams.

* * * * *

UNITED STATES PATENT AND TRADEMARK OFFICE
CERTIFICATE OF CORRECTION

PATENT NO. : 7,543,009 B2  Page 1 of 1
APPLICATION NO. : 10/746851
DATED : June 2, 2009
INVENTOR(S) : Fabio Pisoni It is certified that error appears in the above-identified patent and that said Letters Patent is hereby corrected as shown below:

| | |
|---|---|
| Column 8, Line 58 | Delete: "Fast fractional frourier"<br>Insert: -- Fast fractional fourier -- |
| Column 8, Line 63 | Delete: "(x, alpha"<br>Insert: -- (x, alpha) -- |
| Column 9, Line 7 | Delete: "^42*alpha),"<br>Insert: -- ^2*alpha), -- |
| Column 10, Line 6 | Delete: "delay"<br>Insert: -- delay) -- |
| Column 10, Line 24 | Delete: "The complete. TX"<br>Insert: -- The complete TX -- |
| Column 10, Line 48 | Delete: "(0N/2-1)"<br>Insert: -- (0:N/2-1) -- |
| Column 11, Line 28 | Delete: "dmt_hfi_interpo can"<br>Insert: -- dmt_hfi_interp() can -- |
| Column 11, Line 49 | Delete: "delay_hfi_interpo is"<br>Insert: -- delay_hfi_interp() is-- |

Signed and Sealed this

Fifteenth Day of September, 2009

David J. Kappos
*Director of the United States Patent and Trademark Office*